March 27, 1928.
R. M. EVERETT
VEHICLE SIGNAL
Filed July 12, 1922
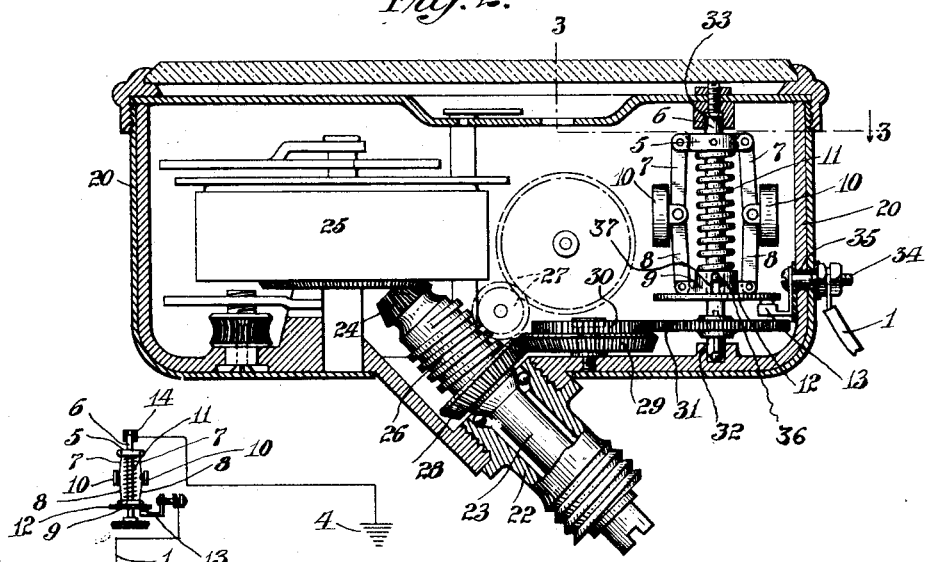
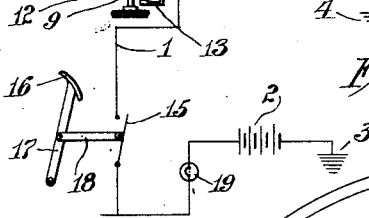
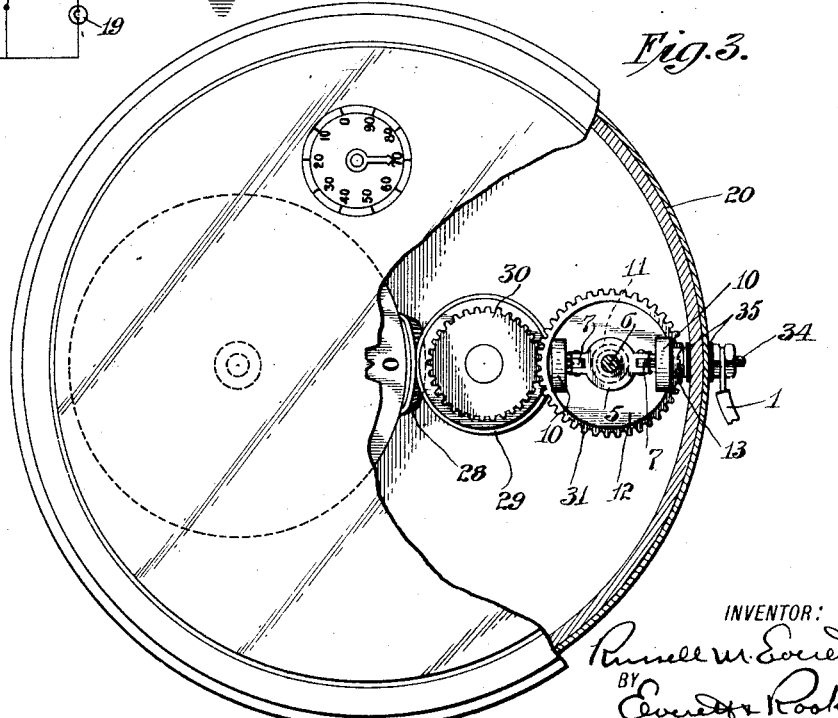
INVENTOR:
Russell M. Everett
BY Everett Rook,
ATTORNEYS.

Patented Mar. 27, 1928.

1,663,691

UNITED STATES PATENT OFFICE.

RUSSELL M. EVERETT, OF BLOOMFIELD, NEW JERSEY.

VEHICLE SIGNAL.

Application filed July 12, 1922. Serial No. 574,441.

This invention relates more especially to stop signals for automobiles, although it can be applied to any signal system, or any vehicle, to which it is adapted, and I do not wish to be understood as restricting its use.

The objects of the invention are to provide a signal system operable by the driver which is also controlled by the speed of the vehicle so as to be inoperative by the driver when the vehicle is above a predetermined speed; to prevent a signal system adapted to be operated by a speed control member, such as a clutch or brake lever, from being operated thereby when such lever is manipulated to prevent excessive speed of the vehicle, rather than to stop it, as in coasting down a steep hill; to provide a stop signal which is displayed only when the vehicle is actually stopping or slowing down to a low rate of speed, and therefore one which never requires to be disregarded; to secure the automatic control of the stop signal from the speedometer, to combine it therewith, and to obtain other results and advantages as may be brought out by the following description.

Referring to the accompanying drawings, in which like numerals of reference indicate the same parts throughout the several views, Figure 1 is a diagrammatic view of a signal system embodying the invention;

Figure 2 illustrates the automatic speed control in connection with a speedometer, in section on line 2—2, Fig. 3, and Figure 3 is a plan of such a speedometer partly in section on line 3—3, Fig. 2.

In the specific embodiment of the invention shown in said drawings and particularly the diagram of Figure 1, 1 indicates the wires of an electric circuit which might be mounted upon a vehicle with a source of electric energy or battery 2 in the circuit and said circuit grounded to the chassis as at 3, 4. Also in said circuit is a centrifugal make-and-break member or switch comprising a cross-piece 5 fast upon a shaft 6 adapted to be turned by the movement of the car, through any suitable connection with the wheels thereof. To said cross-piece 5 are connected arms 7 which at their other ends are pivoted to similar arms 8 upon a second cross-piece 9 adapted to slide upon the shaft 6. At the pivotal connection of the arms 7 and 8 weights 10 are connected so that as the shaft rotates said weights tend to move outward centrifugally, a spring 11 between the cross-pieces 5 and 9 automatically returning the arms 7 and 8 to initial position as the speed decreases. The sliding cross-piece 9 carries a contact member 12 which normally engages a cooperating stationary contact member 13, ends of the circuit wires 1 being connected to said stationary contact member 13 and to some portion of the centrifugal make-and-break member as the bearing 14 for the shaft 6.

The centrifugal make-and-break member is so adjusted that it will remain in contact with the stationary member 13 until a predetermined speed of the vehicle is reached, fifteen miles an hour for example, and will then separate from said stationary contact member 13 so as to break the circuit. At all speeds above fifteen miles an hour, therefore, the circuit is broken and when the speed falls below fifteen miles an hour is again completed.

At another point of the circuit 1 is a switch 15 which is adapted to be closed by some member within the control of the driver of the vehicle, as for example a pedal 16 operating the driving clutch or a brake or both of them, the lever 17 of said pedal being connected in any suitable manner, as indicated by the link 18, to said switch 15 to close the same as the pedal is moved to throw out the clutch or put on the brake.

At another suitable point in the circuit 1 is any ordinary and well-known form of stop signal 19, such as is commonly used at the rear of automobiles.

By means of the apparatus above described, it will be seen that as long as the speed of the vehicle is below a predetermined rate, for example fifteen miles an hour, the circuit 1 is closed through the centrifugal make-and-break device and therefore the stop signal 19 can be operated by the driver, as by manipulating the pedal 16. This enables the driver to show his stop signal when he is about to stop or slow down sufficiently to impede the progress of a car behind him. On the other hand, when the car is travelling at a speed above the predetermined rate, as fifteen miles an hour, the centrifugal make-and-break device opens or breaks the circuit 1, so that the driver cannot display the stop signal 19 as by manipulating the pedal 16, and even though the switch 15 is closed entirely, the circuit still remains open at the centrifugal device and no stop signal is shown. Thus, in simply retarding excessive speed of the car, as in coasting down a long hill without any intention of stopping, the driver can use his pedal 16 without operating his stop signal 19 and creating a wrong impression upon a following car. It is obvious that if the stop signal is displayed every time a driver operates his clutch or brake pedal, it must be disregarded some of the times, as when he is simply preventing excessive speed down hill, and the warning of the stop signal heeded only when the car is about to come to a stop. The usefulness of such a signal is greatly impaired, since the driver of a following car must depend upon his judgment as to when he shall disregard it and when he shall heed it. The purpose of the present invention and of the construction above described is to avoid this impairment of the usefulness of a stop signal and provide one which is never displayed unless the car bearing it is actually going to stop or reduce to a speed slow enough to obstruct the car behind it, and thus secure a stop signal which never has to be disregarded.

I prefer to effect a control of the centrifugal make-and-break means from the speed of the vehicle by associating it with the speedometer, so as to take its movement from the wheels through the same flexible shaft which leads to the speedometer, and house the mechanism of the make-and-break means with the speedometer mechanism by mounting it upon the casing thereof. I do not wish, however, to restrict to this construction, as the make-and-break mechanism controlled by the speed of the vehicle may be mounted and driven in any suitable way.

In Figures 2 and 3 which show one form of the association of the make-and-break means with the speedometer, referred to above, 20 indicates a speedometer casing in the back of which is mounted a bushing 22 forming a bearing for a driving shaft 23 adapted to be connected with the wheel of an automobile to be rotated thereby as is well known. This driving shaft 23 is shown having within the speedometer casing a gear 24 for driving the speed indicating mechanism 25 which may be of an ordinary and well-known construction and needs no further description here. The driving shaft 23 is also shown provided with a worm 26 for driving any suitable means 27 for recording the distance traveled, although this has nothing to do with the present invention.

It is from this driving shaft 23 and preferably within the speedometer casing 20 that I prefer to transmit motion to the centrifugal make-and-break means of my device, and I have shown this done by placing a gear 28 upon the driving shaft 23, which meshes with another gear 29 mounted in the casing 20, as upon the back wall thereof. This gear 20 is shown with a second gear 30 secured flatwise upon itself, concentric therewith, said gear 30 meshing with a gear 31 upon the shaft 6 of the centrifugal make-and-break member of my improved device, said shaft being mounted in bearings 32, 33 on the speedometer casing. Any other suitable detail arrangement of the make-and-break mechanism in or upon the speedometer casing, and any suitable means for transmitting motion thereto from the driving shaft 23, may be employed. The stationary contact member 13 is shown mounted upon the wall of the speedometer by means of a bolt 34 extending therethrough and forming a binding post for the circuit wire 1, said contact member 13 being insulated from the speedometer wall as at 35. Preferably this member 13 is resilient, to secure a better contact, sliding movement of the cross-piece 12 upon the shaft 6 being shown limited in both directions by a pin 36 projecting from the shaft into a slot 37 in the hub of the cross-piece. This pin also serves to key the cross-piece to the shaft.

It will be understood that while I have shown the current of the electric circuit of my device grounded to the chassis and passing through the centrifugal make-and-break member, a circuit could be employed which is wholly insulated from the chassis and provides two adjacent stationary terminals to be engaged and disengaged by the sliding centrifugal make-and-break member so as to close and open the circuit, as will be understood by those skilled in electrical signals. Indeed, any other signal controls than the electric make-and-break device and pedal switch shown might be employed, so long as they operated through one another and were operated by a vehicle control and the speed of the vehicle in the manner set forth. Many other changes might be made in the construction I have shown to illustrate the invention, without departing from the spirit or scope thereof, and I do not wish to be understood as limiting myself except as required by the following claims when construed in the light of the prior art.

Having thus described the invention, what I claim is:

1. The combination with a vehicle signal, of signal controls normally set one to give a signal and another to prevent a signal, means common to both said controls connecting them to the signal, means for causing a vehicle control to operate the signal control normally preventing a signal to give a signal, and means for causing speed of the vehicle to operate the other said signal control to prevent a signal above a predetermined speed.

2. The combination with a vehicle signal included in an electric circuit, of signal controls in series in said circuit and normally set one to give a signal and another to prevent a signal, means for causing a vehicle control to operate the signal control normally preventing a signal to give a signal, and means for causing speed of the vehicle to operate the other said signal control to prevent a signal above a predetermined speed.

3. The combination with a vehicle signal included in an electric circuit, of make-and-break devices in series in said circuit normally set one to give a signal and another to prevent a signal, means for causing a vehicle control to operate the make-and-break device normally preventing a signal to give a signal, and means for causing the speed of the vehicle to operate the other said make-and-break device to prevent a signal above a predetermined speed.

4. The combination with a vehicle signal included in an electric circuit with a normally open make-and-break mechanism in said circuit, and means connecting a vehicle control to said mechanism to close the same when said control is operated, of a normally closed make-and-break mechanism in said circuit in series with said normally open make-and-break mechanism, and means for opening said normally closed make-and-break mechanism by a vehicle speed operated member above a predetermined speed.

5. The combination with a vehicle signal included in an electric circuit with a normally open switch, and means connecting a vehicle control to said switch to close the same when said control is operated, of a normally closed switch in said circuit in series with said normally open switch, and means for causing a vehicle speed operated member to open said normally closed switch above a predetermined speed.

6. The combination with a vehicle caution signal, of a circuit for the signal including a switch having means controlled by a speed indicator of the vehicle for opening the switch at a predetermined speed, a second switch in series with the first-mentioned switch, and mechanical means interconnecting the second switch and a brake control member whereby when the brake is applied the second switch is closed.

7. The combination with a vehicle caution signal, of a circuit for the signal including a switch having means controlled by the speed of the vehicle for opening the switch at a predetermined speed, a second switch in series with the first-mentioned switch, and mechanical means interconnecting the second switch and a vehicle control member whereby when the control is operated the second switch is closed.

RUSSELL M. EVERETT.